Aug. 26, 1930. A. O. OUELLETTE 1,774,036
TIRE CHAIN
Filed April 18, 1929
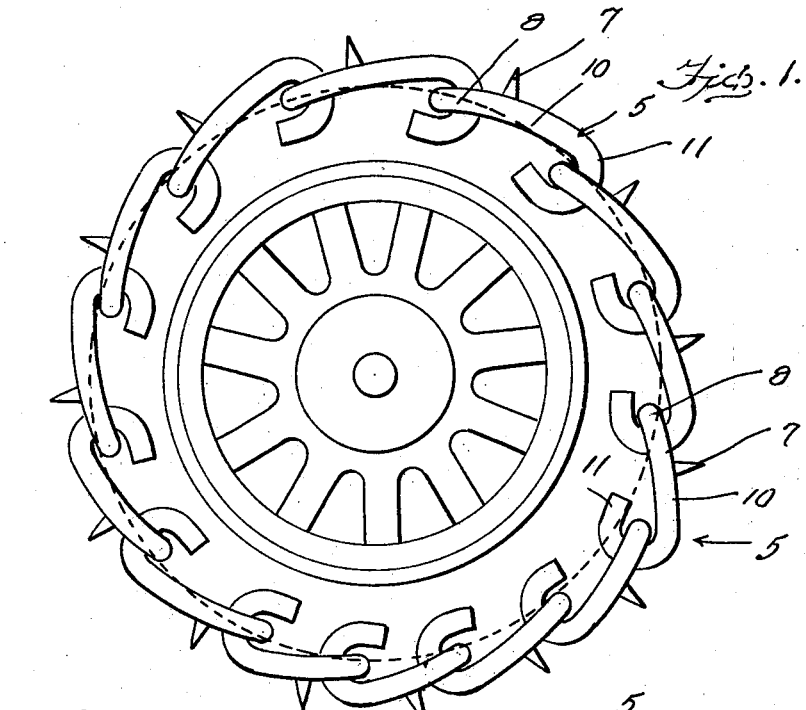
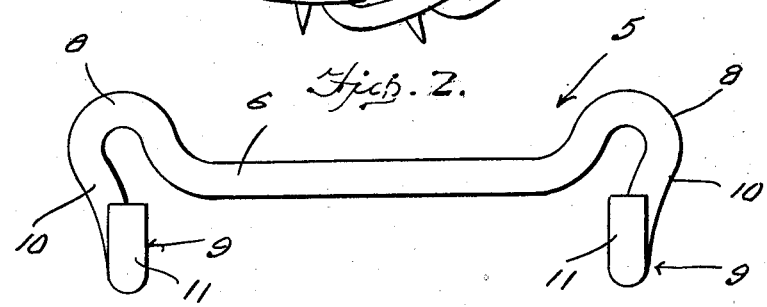
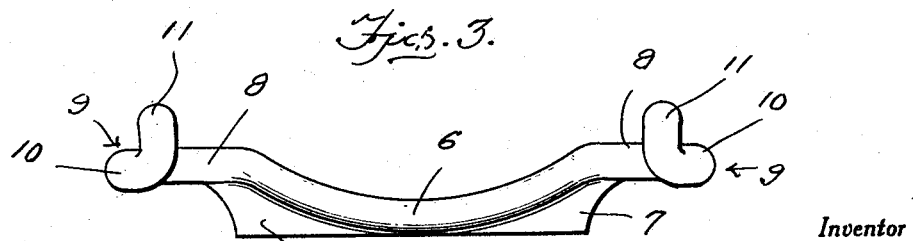
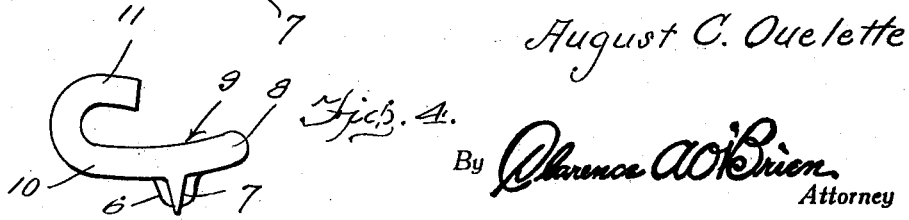
Inventor
August C. Ouelette
By *Clarence A. O'Brien*
Attorney Patented Aug. 26, 1930

1,774,036

UNITED STATES PATENT OFFICE

AUGUST O. OUELLETTE, OF FORT KENT, MAINE

TIRE CHAIN

Application filed April 18, 1929. Serial No. 356,139.

This invention relates broadly to automobile supplies and more particularly to an anti-skid traction or tire chain, for the wheels of a vehicle when travelling over snow or ice.

Ordinary tire chains, so far as I am aware are usually made up of a plurality of permanently connected parts. The customary form of chain comprises circumferential side chains and transverse cross or tread chains, together with appropriate fastening means for connecting the ends of the tire chains together.

The present chain is distinguishable in the art, in that it is composed of a multiplicity of quickly detachable elements, each element being made from a single length of material bent upon itself to provide traction means, and means for connecting the several elements separably together, the arrangement being such that it is necessary to apply the device when the pneumatic tire is in a deflated condition.

The particular arrangement of features which characterize the individual elements which go to make up the complete chain will become more readily apparent as the description proceeds.

In the drawings:

Figure 1 is a side elevational view showing the various elements assembled into a complete chain and showing the chain in position on the inflated tire.

Figure 2 is a top plan view of one of the improved elements.

Figure 3 is a side or face elevational view of the same elements.

Figure 4 is an end view of the same elements.

Each element is generally designated by the reference character 5 and as before stated is made from a single length of material. The material is of circular cross section and includes an intermediate outwardly curved tread portion 6. This portion is longitudinally curved to conform to the tread of the tire. While considering this portion, it is appropriate to refer to Figure 3, where it will be observed that the reference characters 7 designate a pair of longitudinally spaced webs of general triangular configuration. These are disposed on the exterior side and provide traction means. As seen in Figure 1, these webs are of V-shaped cross section to insure anti-slipping construction on the road surface. The end portions of the member are identical in construction. Each end is provided with what may be designated as substantially U-shaped yoke portions 8 directed rearwardly at an obtuse angle with respect to the intermediate portion 6 and these portions constitute keepers and are disposed in outwardly diverging relationship with respect to each other and are substantially in the plane of the tread portion 6. The ends are carried forward and are bent inwardly and rearwardly to provide connecting hooks, each hook being generally designated by the reference character 9.

The hook in each instance includes a suitable curved shank portion 10 and an open bill portion 11. The shank portions of the respective hooks are disposed in converging relationship as plainly seen in Figure 2. This, therefore, permits the various elements 5 to take the assembled relationship seen in Figure 1, for making up the complete chain. It also permits the members to be quickly separated from each other or permits the introduction or removal of these elements. Otherwise considered, these elements might well be referred to as links. The curved central portion 6 conforms to and extends transversely across the tread portion of the tire, whereas the hooks 11 lie at one side of the opposite side walls of the tire casing and are detachably connected together in the manner shown in Figure 1. As before stated, this arrangement makes it necessary before applying the same to deflate the tire. However, it avoids unreliable fasteners and provides a dependable sure grip traction chain for heavy duty work. Of course, when the links are in place, the open bills 11 are inturned, that is, directed inwardly toward the axis of rotation of the wheel, and this avoids accidental disconnection.

From the foregoing description and drawings, it will be seen that I have evolved and produced a novel tire chain composed of distinguishable links, such as are susceptible of economical manufacture and efficient employment in the construction of a dependable tire chain. It is thought, however, that the features and advantages, as well as the assembly and utility will be quite clear from the description and drawings. Therefore a more lengthy description is regarded as unnecessary.

Minor changes in the shape, size, and rearrangement of details and materials may be resorted to, within the scope of the adjoined claims.

What is claimed is:

1. As a new product of manufacture, a link for use in constructing a tire chain of the class described comprising a single body of material including a longitudinally bowed portion having traction webs and having its end portions formed into outwardly and rearwardly diverging substantially U-shaped keepers and having its extremities formed into coupling hooks disposed forwardly of the bowed portion.

2. As a new product of manufacture, a detachable link for use in constructing an adjustable endless tire chain of the type described comprising a single body of material having its central portion longitudinally bowed to provide a tread member, said tread being formed with integral longitudinally spaced V-shaped webs forming traction members, the opposite end portions of said body being provided with outwardly and rearwardly directed yokes of general U-shaped configuration which are substantially in the horizontal plane of the central portion, said yokes constituting keepers, the extremities of the end portions of said yokes being formed into duplicate connecting hooks extending forwardly of the central portion, each hook including a shank, and an open bill, the respective shanks being disposed in inwardly converging relationship to dispose the free end of said bills in substantial alignment with the intermediate portions of the seats of said keepers.

In testimony whereof I affix my signature.

AUGUST O. OUELLETTE.